United States Patent [19]

Ott et al.

[11] Patent Number: 4,569,204
[45] Date of Patent: Feb. 11, 1986

[54] METHOD AND APPARATUS FOR SIMULTANEOUSLY COOLING AND CONVEYING A FOOD SUBSTANCE

[75] Inventors: Lesley E. Ott, Lorain; William H. Cork, Brecksville, both of Ohio

[73] Assignee: AGA, A.B., Cleveland, Ohio

[21] Appl. No.: 710,162

[22] Filed: Mar. 11, 1985

[51] Int. Cl.[4] ............................................. F25D 13/06
[52] U.S. Cl. ................................... 62/63; 62/374; 62/381
[58] Field of Search .................... 62/63, 374, 380, 381

[56] References Cited

U.S. PATENT DOCUMENTS

| | | | |
|---|---|---|---|
| 1,933,258 | 10/1933 | Goosmann | 62/63 |
| 2,116,738 | 5/1938 | Zarotschenzeff | 62/104 |
| 2,298,903 | 10/1942 | Schaub | 99/244 |
| 2,302,169 | 11/1942 | Baker | 62/114 |
| 2,418,746 | 4/1947 | Bartlett et al. | 62/114 |
| 2,456,124 | 12/1948 | Hoffman | 62/114 |
| 2,478,889 | 8/1949 | Harris | 99/210 |
| 3,097,501 | 7/1963 | Pappas | 62/63 |
| 3,214,928 | 11/1965 | Oberdorfer | 62/63 |
| 3,412,573 | 11/1968 | Pauliukonis | 62/374 |
| 3,771,729 | 11/1973 | Frable | 241/65 |
| 3,906,743 | 9/1975 | Schorsch et al. | 62/374 |
| 3,990,641 | 11/1976 | Weston | 241/17 |
| 3,992,899 | 11/1976 | Spahn | 62/374 |
| 4,033,142 | 7/1977 | Schorsch et al. | 62/381 |
| 4,084,387 | 4/1978 | Schorsch et al. | 62/63 |
| 4,475,351 | 10/1984 | Klee | 62/63 |
| 4,499,740 | 2/1985 | Older et al. | 62/374 |
| 4,528,819 | 7/1985 | Klee | 62/374 |

Primary Examiner—Ronald C. Capossela
Attorney, Agent, or Firm—David A. Burge

[57] ABSTRACT

A method and apparatus are provided for rapidly and efficiently cooling a flow of a food substance such as ground chicken meat while simultaneously conveying the food substance along a relatively short, upwardly inclined travel path that is defined by an inner chamber of an elongate housing assembly. A power driven auger extends along the travel path and is journaled by the housing assembly for rotation within the inner chamber. An inlet hopper is provided for introducing a flow of relatively warm food substance into a lower end region of the inner chamber. A discharge spout is provided for discharging a cooled flow of the food substance from an upper end region of the inner chamber. Cooling of the food substance as it is conveyed along the travel path is effected by providing the housing assembly with a refrigerant chamber that surrounds but is segregated from the inner chamber. Liquid cryogen is introduced into the refrigerant chamber and evaporates to form a gas as it serves to indirectly cool the food substance flow that is being fed through the inner chamber. The temperature of the discharging food substance is maintained within desired limits by monitoring the temperature of the evaporated cryogen that is permitted to discharge from the refrigerant chamber, and by utilizing the monitored gas discharge temperature as a key factor in controlling the supply of liquid cryogen to the refrigerant chamber.

17 Claims, 5 Drawing Figures

METHOD AND APPARATUS FOR SIMULTANEOUSLY COOLING AND CONVEYING A FOOD SUBSTANCE

BACKGROUND OF THE INVENTION

1. Field of the Invention

The present invention relates generally to a method and apparatus for rapidly chilling a flow of a food substance such as ground meat or the like as the food substance flow is conveyed along a path of travel that extends substantially axially through a generally cylindrical housing assembly. More particularly, the present invention relates to the use of an auger-type conveyor that has a housing assembly with coaxially-arranged casings which define an inner chamber wherein an auger rotates to convey a flow of food substance from an inlet to an outlet, and a surrounding refrigerant chamber to which liquid cryogen is supplied, and from which cryogen that has evaporated to form a gas is discharged. The temperature of the discharging gas is monitored and is utilized in regulating the supply of liquid cryogen to the refrigerant chamber. By regulating the supply of liquid cryogen so that the discharging gas has a temperature that lies within predetermined limits, the temperature of the food substance that discharges from the apparatus is likewise maintained within desired limits that may be required to permit further processing of the food substance.

2. Prior Art

It is known to utilize auger-type conveyors, sometimes referred to as "screw-type" conveyors, to convey a flow of a food substance such as ground meat along a predetermined path of travel, and to expose the flow of food substance directly to various types of cryogenic materials to rapidly cool and/or to quick freeze the food substance. However, direct exposure of certain comestibles such as ground chicken meat to cryogenic materials such as liquid or solidified carbon dioxide often has been found to have a deleterious effect on the quality of the food substance. For example, some direct exposures of ground chicken meat to liquid carbon dioxide have been found to enhance the tendency of the meat to serve as a host media for bacterial growth, i.e., to promote the onset of rancidity. Especially with such comestibles as ground chicken meat, direct exposure to cryogens such as liquid or solidified carbon dioxide have been deemed to constitute an inappropriate means of diminishing the temperature of the meat from a typically encountered processing temperature of 70°-80° F. to a packing temperature of 40° F. or below.

Other proposals have called for the use of an auger-type conveyor for conveying a flow of food substance from one location to another during processing, with a limited degree of concurrent refrigeration being provided by surrounding a housing of the auger-type conveyor with various forms of refrigeration units, or by incorporating refrigeration coils or refrigerant flow paths into side wall portions of the housing. However, such proposals typically have suffered from such drawbacks as failing to provide adequate refrigeration capacity to rapidly diminish the temperature of the flow of food substance to desired degrees as the flow is conveyed along a travel path that is defined by the auger, failing to effect an adequately uniform cooling of the food substance as it is conveyed along the travel path defined by the auger, and failing to provide refrigeration techniques that can adequately accomodate and properly adjust for typically encountered variations in the rate of flow of the food substance that is being fed into the conveyor, and/or typical variations in the character, consistency and temperature of the food substance that is being fed into the conveyor. Previously proposed refrigeration systems for use with auger-type conveyors have been undesirably expensive to purchase and maintain due to their complexities of construction, have been undesirably expensive to operate in view of the ineffective manners in which they employ refrigerant, and have not been as responsive or as adjustable as has been needed to accommodate variations in flow rates, character, consistency and temperature of such comestible products as are typically fed along auger-defined flow paths.

SUMMARY OF THE INVENTION

The present invention addresses the foregoing and other needs and drawbacks of prior proposals by providing a novel and improved, relatively simple and inexpensive, yet highly effective and responsive method and apparatus for concurrently conveying a flow of food substance along a predetermined path of travel and effecting a desired degree of cooling of the food substance flow. Moreover, the system of the present invention is well adapted to accomodate such changes in rate of flow, character, consistency, temperature and the like as are typically encountered in packing plants and the like where continuous flows of food substances are generated that need to be conveyed and cooled prior to further processing.

Particular advantages of the system of the present invention lies in the simplicity of the apparatus that is utilized to implement the preferred practice of the invention, and in the simplicity of the operation of the apparatus whereby monitoring of a single variable, namely the temperature of evaporated cryogen gas that is discharged from a refrigerant chamber is used in regulating a supply of liquid cryogen to the refrigerant chamber so that the desired objective of maintaining the temperature of a discharging flow of food substance within predetermined limits is achieved. The discoveries (1) that the monitored temperature of refrigerant discharged from a refrigeration chamber can be employed quite effectively as a key control parameter in regulating the supply of liquid croygen to the refrigerant chamber, and (2) that by so regulating the supply of liquid cryogen to the refrigerant chamber to maintain the temperature of discharging refrigerant gas within desired limits will likewise cause the temperature of a discharging flow of food substance to have its temperature maintained within desired limits represents a most unexpected result that prototype testing has proved to be very unexpectedly versatile in its ability to accommodate and adjust for significant changes in flow rate, character, consistency and temperature while continuing to maintain the temperature of a discharging flow of food substance within desired limits. Stated in another way, the approach employed by the system of the present invention, while relatively simple and straightforward in character, provides very unexpectedly advantageous results and is clearly novel and non-obvious.

In addition, the preferred practice of the invention features a very efficient use of a relatively inexpensive cryogen refrigerant of a non-toxic, inert type (typically liquid nitrogen) that can simply be vented to atmosphere when the essence of its useful cooling potential has been extracted, whereby the need for complex equipment to effect recirculation and reuse of refrigerant as by compression, expansion, and controlled flow through heat exchangers is eliminated. The practice of the present invention is enhanced by employing liquid nitrogen as the refrigerant that is introduced into the refrigerant chamber, and by arranging the configuration and operation of the system so that liquid nitrogen that is introduced at about $-320°$ F. is caused to evaporate to form nitrogen gas that eventually discharges from the refrigerant chamber at about $36°$ F., i.e., at about $4°$ F. below the target temperature of $40°$ F. for discharge of the flow of food substance.

By arranging the system of the invention so that a supply of liquid cryogen in refrigeration is replenished as needed in response to sensing of the temperature of evaporated cryogen gas that is being discharged from the refrigeration chamber, a very simple, very effective and highly responsive system of control is provided that adequately accommodates variations in feed rate, character, consistency and temperature of the food substance flow that is delivered to the conveyor, while also assuring that efficient use is made of the cryogen refrigerant.

In preferred practice, an apparatus is provided for removing heat energy from a substantially continuous flow of a food substance such as ground meat or the like while conveying the flow of food substance along a path of travel from an inlet to an outlet. The extent to which heat energy is removed from the flow of food substance is adjustable to accommodate variations in character, consistency, and temperature of the food substance that enters the inlet to form said flow, while assuring that the temperature of the food substance that discharges through the outlet does not exceed a predetermined maximum discharge temperature. The apparatus preferably includes a conveyor assembly having an auger that is rotatable about an axis of rotation, and having a housing assembly that includes an inner, generally cylindrical casing that defines an elongate, generally cylindrical inner chamber which surrounds at least a portion of the auger and which extends between inlet and outlet locations that are spaced along the axis of rotation. The housing assembly also includes structure that defines an inlet for communicating with the inner chamber at the inlet location, and an outlet for communicating with the inner chamber at the outlet location. The auger and the housing assembly are cooperable such that, when the auger is rotated relative to the housing assembly about the axis of rotation, the conveyor assembly will operate to convey a flow of food substance such as ground meat or the like that is ducted through the inlet to the inlet location and is thence caused to be conveyed along a path of travel that extends through the inner chamber of the housing assembly from the inlet location to the outlet location for discharge from the inner chamber through the outlet.

The conveyor assembly additionally includes a power drive unit such as a variable speed motor that is drivingly connected to the auger for rotating the auger about the axis of rotation relative to the housing assembly at a predetermined speed of rotation and in a rotational direction that will cause the auger to convey the flow of food substance through the inner chamber of the housing assembly along the travel path from the inlet to the outlet. The conveyor assembly further includes support structure for supporting the housing assembly, for supporting and journaling the auger for rotation about the axis of rotation, and for supporting the power drive unit. The support structure additionally serves to support the housing assembly and the auger such that the inner chamber of the housing assembly and the axis of rotation of the auger are inclined at a predetermined angle of inclination with respect to a floor or other planar support surface on which the apparatus is stationed (i.e., with respect to the horizontal) whereby the path of travel that is followed by the flow of food substance as it is conveyed through the inner chamber of the housing assembly is inclined relatively upwardly from the inlet location to the outlet location. While a variety of angles of inclination have been employed in prototype testing, and while angles with a range of about ten degrees to about thirty degrees are operable, a preferred angle of inclination of about sixteen degrees is found to produce good operating efficiency in a wide range of operating environments of the type that are encountered in packing plants and the like.

The apparatus embodying the preferred practice of the invention also includes heat extraction assembly for cooling the inner casing of the housing means so that, as the flow of food substance is conveyed through the inner chamber from the inlet location to the outlet location, heat energy is caused to be removed from the food substance by virtue of its being cooled through conductive heat transfer as the food substance engages the cooled inner casing. The heat extraction means includes a second casing that surrounds the inner casing along at least a part of the length of the inner casing that extends between the inlet location and the outlet location. The second and inner casings cooperate to define a generally annular refrigerant chamber that surrounds the inner casing for containing a refrigerant therein that is operable to cool the inner casing while also serving to segregate the refrigerant from coming into direct contact with the food substance flow. The second casing is of generally cylindrical configuration and is oriented to extend substantially coaxially about the inner casing such that the second casing has a lower end region located in proximity to the food flow inlet, and an upper end region located in proximity to the food flow outlet. The heat extraction means further includes a refrigerant inlet for introducing refrigerant into the annular refrigerant chamber in proximity to the lower end region of the second casing, and a refrigerant outlet for discharging refrigerant from the annular refrigerant chamber in proximity to the upper end region of the second casing. The heat extraction means also includes structure that cooperates with at least a selected one of the inner and second casings to define at least one path of flow for refrigerant that extends from the refrigerant inlet to the refrigerant outlet, with the refrigerant flow path extending about the circumference of the inner casing to maximize the extent to which the refrigerant is brought into heat transfer relationship with the inner casing.

The apparatus also includes a refrigeration control system for adjusting the degree to which the heat extraction means is operable to withdraw heat energy from the inner casing and to thereby cool the flow of food substance that is conveyed through the inner casing. The control includes a transducer for sensing the temperature at which gaseous refrigerant is permitted to discharge from the refrigerant outlet, and an inlet valve for admitting additional liquid cryogen through the refrigerant inlet in response to sensed need, as is detected by monitoring the temperature of the discharging gaseous refrigerant. The refrigeration control introduces liquid cryogen into the refrigerant chamber as is needed to maintain the temperature of the discharged refrigerant gas at or only slightly below a predetermined temperature, with the predetermined refrigerant discharge temperature being selected to be lower than a predetermined maximum discharge temperature for the flow of food substance that exits through the food outlet. The difference between the predetermined refrigerant discharge temperature and the predetermined food substance discharge temperature is selected by experimentation to be such as will assure that, to the extent that the flow of food substance that passes through the apparatus may vary in character, content and inlet temperature, the temperature at which the flow of food substance discharges from the apparatus will not exceed the predetermined maximum discharge temperature for the discharging flow of food, and such that the temperature of the discharging flow of food substance will not differ by more than a few degrees Fahrenheit from the maximum predetermined discharge temperature for the discharging flow of food despite such variations as may occur in character, consistency and temperature of the food substance that enters the inlet of the apparatus.

Stated more concisely, tests conducted with an apparatus that embodies the preferred practice of the present invention have shown that a flow of food substance can be conveyed and cooled to a discharge temperature that lies within desired temperature limits, with the apparatus using a very simple sort of cryogen flow refrigeration system, and with temperature regulation of the discharging food being effected by controlling the supply of liquid cryogen to a refrigerant chamber as a function of sensed temperature of refrigerant gas that discharged from the refrigerant chamber. This simplistic approach to cooling and conveying a flow of food substance provides very unexpectedly results especially in the degree to which it is very versatile in its ability to accommodate significant changes in flow rate, character, consistency and temperature of a supplied flow of food substance, and is novel and unobvious.

BRIEF DESCRIPTION OF THE DRAWINGS

The foregoing and other features and a fuller understanding of the invention may be had by referring to the following description and claims, taken in conjunction with the accompanying drawings, wherein:

DESCRIPTION OF THE PREFERRED EMBODIMENT

Figure 1:
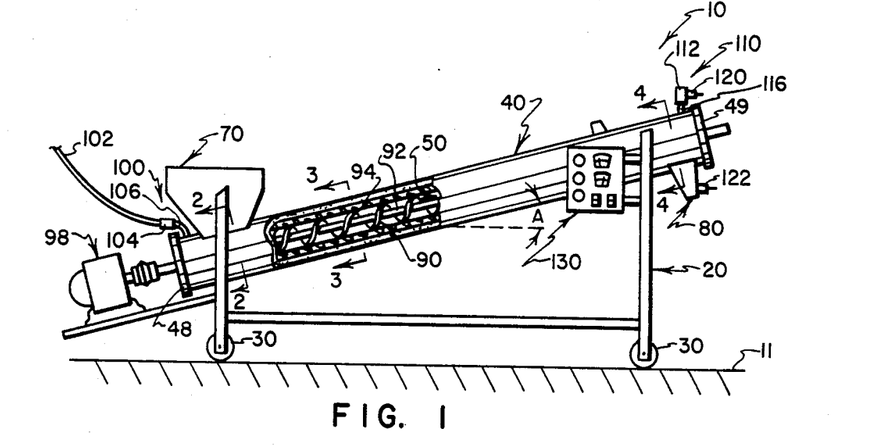
FIG. 1 is a side elevational view of an apparatus for carrying out the preferred practice of the present invention, with portions of a housing assembly of the apparatus broken away to permit inner details of construction to be viewed.

Referring to FIG. 1, an apparatus employed in the preferred practice of the system of the present invention is indicated generally by the numeral 10. The apparatus 10 includes an upstanding support structure 20 that is movably supported atop a floor surface 11 by wheels 30. An elongate, generally cylindrical housing assembly 40 is carried by the structure 20 and has an inner chamber 50 that defines a path of travel for conveying a flow of food substance from an inlet hopper 70 to a discharge spout 80.

Figure 3:
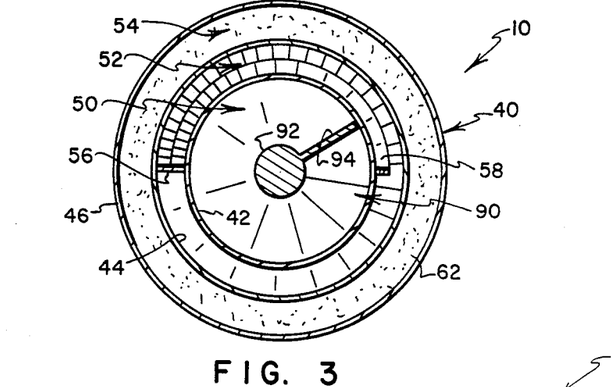
Figure 5:
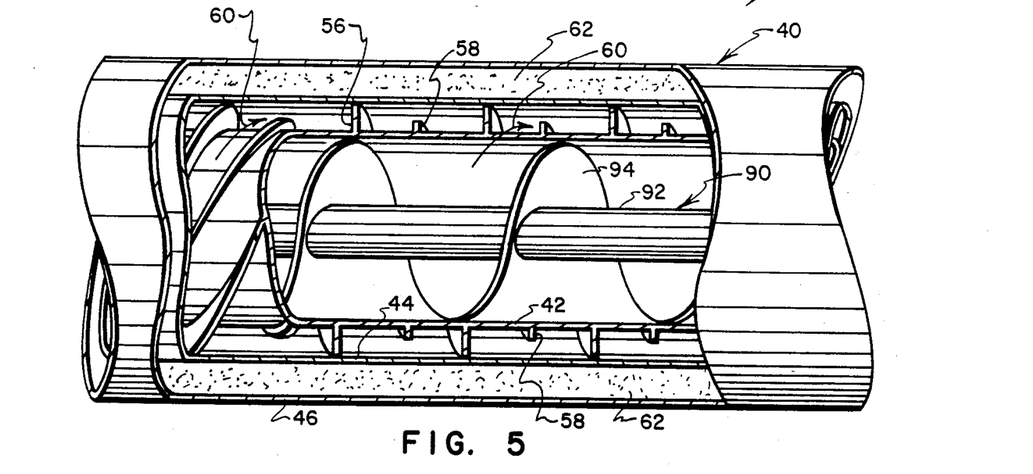

Referring to FIGS. 1, 3 and 5, the housing assembly 40 includes an inner casing 42, an outer casing 46, and an intermediate casing 44, with the casings 42, 44, 46 being of generally cylindrical configuration and being coaxially nested one within another such that the inner casing 42 defines the inner chamber 50, such that a first surrounding annular chamber 52 is defined between the inner and intermediate casings 42, 44, and such that a second annular chamber 54 is defined between the intermediate and outer casings 44, 46.

The concentric axes (not shown) of the casings 42, 44, 46 and the conincident axis of rotation of the auger 90 that extends through the casing 42 are supported such that they incline upwardly from the horizontal at an angle of inclination designated in FIG. 1 by the letter "A." The angle A has been found to be operative within a range of about 10 to about 30 degrees, with a preferred value of about 16 degrees.

A generally helical-shaped barrier 56 extends between the inner and intermediate casings 42, 44 to define a helical, corkscrew-like flow path 60 for refrigerant that is introduced into the lower end region of the first surrounding chamber 52. A generally helical-shaped fin 58 extends about and is secured to the outer wall of the inner casing 42 and extends into the refrigerant chamber 52. The purpose of the fin 58 is to assist in enhancing the surface area of the inner casing 42 that is exposed to refrigerant flow along the refrigerant flow path 60. An insulating material 62 such as foamed in-situ polyurethane fills the second surrounding chamber 54.

Figure 2:
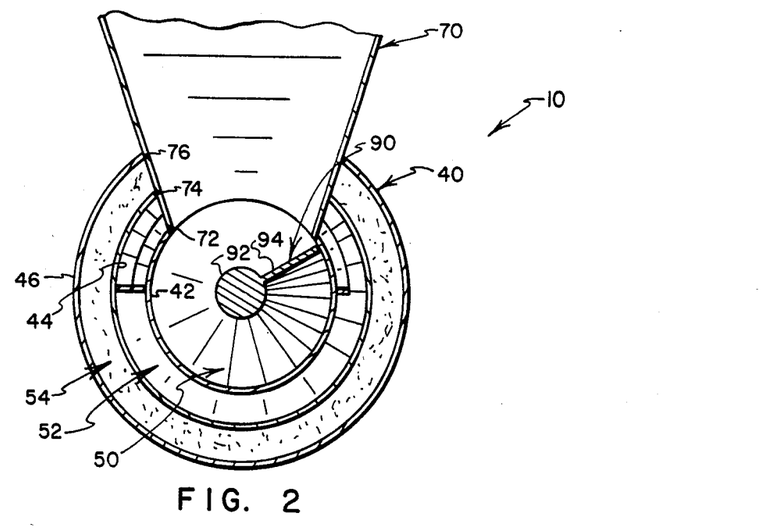
FIGS. 2, 3 and 4 are sectional views on an enlarged scale as seen from planes indicated by lines 2—2, 3—3 and 4—4 in FIG. 1; and, FIG. 5 is an enlargement of a portion of the side elevational view of FIG. 1.
Figure 4:
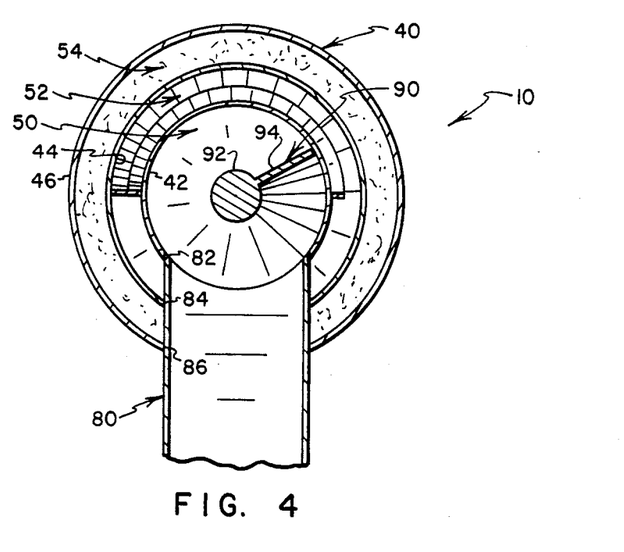

Referring to FIG. 2, the inlet hopper 70 extends through aligned openings 72, 74, 76 formed through the casings 42, 44, 46, respectively, to introduce a flow of food substance into the inner chamber 50 of the casing 42. Referring to FIG. 4, the outlet spout 80 extends through aligned openings 82, 84, 86 formed in the casings 42, 44, 46, respectively, to provide a means for discharging a flow of food substance from the inner chamber 50 of the inner casing 42.

Referring to FIGS. 1–5, an auger 90 extends through the inner chamber 50. The auger 90 has an elongate drive shaft 92 that carries one or more helically wrapped vanes or blades 94. The housing assembly 40 has lower and upper structures 48, 49 that carry suitable bearings (not shown) to journal the shaft 92 for rotation about its central axis which extends coaxially through the housing assembly 40. A power drive unit in the form of a variable speed motor 98 is carried by the support structure 20 and is drivingly connected to the auger shaft 92 to rotate the auger 90. When the auger 90 is rotated by the drive motor 98, the auger 90 is operable to convey a flow of food substance that enters the inner casing 42 through the inlet hopper 70 along the length of the casing 42 (i.e., through the inner chamber 50) for discharge through the spout 80. Because a flow of refrigerant is maintained in the first surrounding chamber 52, the flow of food substance traveling through the inner chamber 50 is cooled as it is conveyed through the chamber 50, because the auger 90 causes the food substance flow to conductively engage the cold casing 42 as the food substance flow moves through the inner chamber 50.

Referring to FIG. 1, a refrigerant inlet assembly, indicated generally by the numeral 100, is provided near the lower end region of the housing assembly 40. The refrigerant inlet assembly 100 includes a conventional flexible cryogen supply hose 102 that is adapted for connection (using conventional fittings that are not shown) to a conventional cryogen supply reservoir (not shown) such as an insulated canister of liquid nitrogen that is typically maintained at about −320° F. The inlet assembly 100 also includes a conventional, electrically controllable, normally closed, variable flow valve 104 that is used to control the rate of flow at which cryogen is fed from the supply hose 102 to an inlet tube 106. The inlet tube 106 communicates with the first surrounding chamber 52 to introduce liquid cryogen into the chamber 52 at a location near the lower end region of the refrigerant chamber 52, with the entering liquid cryogen typically being liquid nitrogen having a temperature of about −320° F.

Referring still to FIG. 1, a refrigerant outlet assembly, indicated generally by the numeral 110, is provided near the upper end region of the housing assembly 440. The refrigerant outlet assembly 110 includes a conventional pressure relief and discharge valve 112 that is communicated with the refrigerant chamber 52 by an outlet tube 116. The valve 112 is a conventional device of the type that is used to vent materials such as gaseous nitrogen to the atmosphere. As evaporated cryogen in the form of a gas comes to fill much of the refrigerant chamber 52, it establishes a positive pressure within the chamber 52. The valve 112 not only serves to maintain an appropriate level of this positive pressure within the refrigerant chamber 52, but also serves to release refrigerant gas, the useful cooling potential of which has been substantially exhausted. The outlet assembly 110 also includes a temperature sensor 120 in the form of a transducer that serves to provide an electrical signal that is representative of the temperature of the discharging refrigerant gas. A similar temperature transducer 122 may (optionally) be carried by the discharge spout 80 to provide an electrical signal that is indicative of the temperature of the discharging flow of food substance through the spout 80.

A control panel 130 is provided for operating the apparatus 10. The panel 130 is electrically connected by suitable conductors (not shown) to the cryogen inlet valve 104 to control its operation, and to the transducers 120, 122 to receive temperature-representative signals from the transducers 120, 122 that can be displayed by suitable gauges or the like carried on the panel 130, and that can be used by the panel 130 to control operation of the apparatus 10 as will be explained. Still further, the control panel 130 includes a suitable array of conventional controls to permit manual adjustment of the speed at which the motor 98 rotates the auger 90, and of the rate at which liquid cryogen refrigerant is admitted to the refrigerant chamber 52 by the inlet valve 104.

In operation, a substantially constant rate of flow of food substance is preferably established by appropriately manually adjusting the speed of rotation of the auger 90 so that the auger 90 establishes a flow rate through the inner housing chamber 50 that closely approximates the average delivery rate at which a flow of food substance is introduced into the inlet hopper 70. If a desired discharge temperature for the food substance that exits from the outlet spout 80 is 40° F. or slightly less (if a desired range of temperature limits for discharging food is perhaps 36°-40° F. ), the supply of cryogen to the refrigerant chamber 52 is adjusted by setting the control panel to 130 maintain a refrigerant gas discharge temperature through the valve 112 of a few degrees (typically about 4° F.) below the desired maximum discharge temperature of the food substance, and the settings of the controls of the panel 130 are then "fine tuned" to assure that, with a minimal inlet flow rate of liquid cryogen to the refrigerant chamber 52, the desired maximum temperature of 40° F. for discharging food is closely approximated but not exceeded (i.e., the range of permitted food discharge temperatures of 36°-40° F. is held by maintaining the refrigerant gas discharge temperature within a range of about 32°-36° F.).

A significant feature of the invention lies in its use of a very simple temperature control approach, the effectiveness of which has been proved through prototype testing, namely that variations in flow rate, character, consistency and temperature of an incoming flow of food substance can be accommodated with food flow discharge temperature being maintained quite nicely within desired limits by monitoring as a control input parameter not the temperature of the discharging food-flow itself, but rather the more useful, more informative parameter of discharging refrigerant gas temperature, which parameter can be employed in controlling the supply of liquid cryogen refrigerant that is admitted to the refrigerant chamber such that liquid cryogen is supplied only as it is truly needed, the supply is adjusted to accommodate variations in need as they may occur, and food discharge temperature is thereby maintained closely within predetermined limits.

Optionally, if desired, the control panel 130 may be provided with a conventional audible alarm such as a bell or buzzer that is set to sound in the event that the transducer 122 should sense a food discharge temperature that lies outside the permitted temperature range, or above a predetermined maximum temperature for food discharge such as 40° F.

Although the invention has been described in its preferred form with a certain degree of particularity, it will be understood that the present disclosure of the preferred form has been made only by way of example, and that numerous changes in the details of construction and the combination and arrangement of parts, procedures and the like may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. Apparatus for removing heat energy from a substantially continuous flow of a food substance such as ground meat or the like while conveying the flow of food substance along a path of travel from an inlet to an outlet, with the extent to which heat energy is removed from the flow of food substance being adjustable to accommodate variations in flow rate character, consistency, and temperature or the like of the flow of food substance that enters the inlet, while assuring that the temperature of the food substance that discharges through the outlet does not exceed a predetermined maximum discharge temperature, the apparatus comprising:

(a) a conveyor assembly including auger means for rotation about an axis of rotation, and housing means including an inner, generally cylindrical casing that defines an elongate, generally cylindrical inner chamber that surrounds at least a portion of the auger means and that extends between inlet and outlet locations that are spaced along the axis of rotation, with the housing means additionally including structure defining inlet means for communicating with the inner chamber at the inlet location, and defining outlet means for communicating with the inner chamber at the outlet location, and with the auger means and the housing means being cooperable such that, when the auger means is rotated relative to the housing means about the axis of rotation, the conveyor assembly will operate to convey a flow of food substance such as ground meat or the like that is ducted through the inlet means to the inlet location and is thence caused to be conveyed along a path of travel that extends through the inner chamber of the housing means from the inlet location to the outlet location for discharge from the inner chamber through the outlet means, the conveyor assembly additionally including power operated means drivingly connected to the auger means for rotating the auger means about the axis of rotation relative to the housing means at a predetermined speed of rotation and in a rotational direction that will cause the auger means to convey said flow of food substance through the inner chamber of the housing means along said travel path from the inlet means to the outlet means, and further including support means for supporting and journaling the auger means for rotation about the axis of rotation, and for supporting the power operated means, the support means additionally including floor engaging means for engaging a substantially planar support surface such as a floor, and the support means further being operable to support the housing means and the auger means such that the inner chamber of the housing means and the axis of rotation of the auger means are inclined at a predetermined angle of inclination with respect to a support surface on which the floor engaging means serves to support the conveyor assembly, and such that the path of travel that is followed by the flow of food substance as it is conveyed through the inner chamber of the housing means is inclined relatively upwardly from the inlet location to the outlet location;

(b) heat extraction means for cooling the inner casing of the housing means so that, as the flow of food substance is conveyed through the inner chamber from the inlet location to the outlet location, heat energy is caused to be removed from the food substance by virtue of its being cooled through conductive heat transfer as the food substance engages the cooled inner casing, the heat extraction means including a second casing that surrounds the inner casing along at least a part of the length of the inner casing that extends between the inlet location and the outlet location, and that cooperates with the inner casing to define a generally annular refrigerant chamber that surrounds at least said part of the length of the inner casing for containing a refrigerant therein that is operable to cool the inner casing while also serving to contain the refrigerant so that the refrigerant is segregated from and does not come into direct contact with such food substance as may be fed through the inlet means, through the inner chamber and through the outlet means, the second casing being of generally cylindrical configuration and being oriented to extend substantially coaxially about the inner casing such that the second casing has a lower end region located in proximity to the inlet means, and an upper end region located in proximity to the outlet means, the heat extraction means further including refrigerant inlet means for introducing refrigerant into the annular refrigerant chamber in proximity to the lower end region of the second casing, and refrigerant outlet means for discharging refrigerant from the annular refrigerant chamber in proximity to the upper end region of the second casing, and including refrigerant flow path defining means cooperating with at least a selected one of the inner casing and the second casing to define at least one path of flow for refrigerant that extends from the refrigerant inlet means to the refrigerant outlet means, with the at least one path of flow for refrigerant extending about the circumference of the inner casing to enhance the extent to which the refrigerant is brought into heat transfer relationship with the inner casing as the refrigerant is ducted along said at least one path of flow for refrigerant; and, (c) refrigeration control means for adjusting the degree to which the heat extraction means is operable to withdraw heat energy from the inner casing and to thereby cool the flow of food substance that is conveyed through the inner chamber, the control means including means for sensing the temperature at which refrigerant is permitted to discharge from the refrigerant outlet means, and valve means for admitting additional refrigerant to the refrigerant inlet means in response to sensed temperature of the discharged refrigerant, with the refrigeration control means being operable to introduce refrigerant in the form of a liquid cryogen through the refrigerant inlet means as such liquid cryogen is needed to maintain the temperature of the discharged refrigerant at or only slightly below a predetermined refrigerant discharge temperature, with the predetermined refrigerant discharge temperature being selected to be a temperature at which the liquid cryogen will have evaporated to form a refrigerant gas, and being selected to be lower than a predetermined maximum discharge temperature for the food substance that discharges from the outlet means, and with the difference between the predetermined refrigerant discharge temperature and the predetermined maximum discharge temperature for the food substance being such as will assure that, to the extent that the flow of food substance that passes through the apparatus may vary in character, content and inlet temperature, the temperature at which the flow of food substance discharges from the discharge means will not exceed said predetermined maximum discharge temperature for the discharging flow of food, and such that the temperature at which the flow of food substance discharges from the discharge means will not differ by more than a few degrees Fahrenheit from said maximum predetermined discharge temperature for the discharging flow of food despite such variations as may occur in flow rate, character, consistency, temperature and the like of the food substance that enters the inlet means.

2. The apparatus of claim 1 wherein the heat extraction means includes structure for closing and sealing the lower and upper end regions of the second casing to the extent that the annular refrigerant chamber defines a closed, pressurizable chamber within which refrigerant in the form of liquid cryogen and/or evaporated cryogen materials may be retained with a positive pressure being maintained in the refrigerant chamber.

3. The apparatus of claim 2 wherein the refrigerant outlet means includes pressure responsive valve means for permitting discharge of gaseous refrigerant from the refrigerant chamber as may be required to prevent such positive pressure as may be maintained within the annular refrigerant chamber from exceeding a predetermined positive pressure.

4. The apparatus of claim 3 wherein the refrigerant inlet means includes conduit means for connection to a source of liquid cryogen such as liquid nitrogen, and the refrigerant inlet means is operable to admit said liquid cryogen into the lower end region of the refrigerant chamber, whereby as the liquid cryogen travels along the refrigerant flow path and becomes heated as it takes on heat energy by cooling the inner casing, at least a portion of the liquid cryogen is caused to evaporate to form gaseous refrigerant, and the pressure of the refrigerant within the refrigerant chamber is controlled by the pressure responsive valve means which serves to discharge portions of the gaseous refrigerant when positive the pressure within the refrigerant chamber tends to exceed said predetermined positive pressure.

5. The apparatus of claim 1 additionally including:
(a) a third casing that surrounds at least a majority of such portions of the second casing as serve to define the annular refrigerant chamber;
(b) the third casing cooperating with the second casing to define a substantially annular insulating chamber that surrounds the vicinity of the annular refrigerant chamber; and,
(c) thermal insulation means carried within the insulating chamber for insulating the annular refrigerant chamber from the ambient environment.

6. The apparatus of claim 5 wherein the thermal insulation means is a polyurethane foam that has been foamed in-situ within the insulating chamber to substantially fill the insulating chamber.

7. The apparatus of claim 1 wherein the power operated means for rotating the auger means includes a variable speed motor and speed control means for permitting the speed at which the auger means is rotated about its axis of rotation to be selected to most advantageously serve the needs of the flow rate, character, consistency and temperature of the food substance that enters the inlet means, and to aid in accommodating variations in said flow rate, character, consistency and temperature.

8. The apparatus of claim 1 additionally including temperature sensing means for monitoring the temperature of the food substance that discharges from the outlet means to assure that the temperature of the discharging food substance does not exceed said predetermined maximum temperature.

9. The apparatus of claim 1 wherein the floor engaging means of the support means includes a plurality wheel means for engaging a support surface such as a floor and for facilitating movement the apparatus across the support surface as may be needed to reposition the inlet means and the outlet means for use with such other food processing apparatus as may be empoyed to provide a flow of food substance that enters the inlet means and/or to further process a flow of cooled food substance that discharges from the outlet means.

10. The apparatus of claim 1 wherein the angle of inclination is within the range of about ten to about thirty degrees.

11. The apparatus of claim 1 wherein the angle of inclination is approximately sixteen degrees.

12. A method of removing heat energy from a substantially continuous flow of a food substance such as ground meat or the like while conveying the flow of food substance along a path of travel from an inlet to an outlet, with the extent to which heat energy is removed from the flow of food substance being adjustable to accommodate differences in flow rate, character, consistency, and temperature or the like of the flow of food substance that enters the inlet, while assuring that the temperature of the food substance that discharges through the outlet does not exceed a predetermined maximum discharge temperature, comprising the steps of:

(a) providing a conveyor assembly having auger means for rotation about an axis of rotation, and housing means including an inner, generally cylindrical casing that defines an elongate, generally cylindrical inner chamber that surrounds at least a portion of the auger means and that extends between inlet and outlet locations that are spaced along the axis of rotation, with the housing means additionally including structure defining inlet means for communicating with the inner chamber at the inlet location, and defining outlet means for communicating with the inner chamber at the outlet location, and with the auger means and the housing means being cooperable such that, when the auger means is rotated relative to the housing means about the axis of rotation, the conveyor assembly will operate to convey a flow of food substance such as ground meat or the like that is ducted through the inlet means to the inlet location and is thence caused to be conveyed along a path of travel that extends through the inner chamber of the housing means from the inlet location to the outlet location for discharge from the inner chamber through the outlet means, the conveyor assembly additionally including power operated means drivingly connected to the auger means for rotating the auger means about the axis of rotation relative to the housing means at a predetermined speed of rotation and in a rotational direction that will cause the auger means to convey said flow of food substance through the inner chamber of the housing means along said travel path from the inlet means to the outlet means, and further including support means for supporting and journaling the auger means for rotation about the axis of rotation, and for supporting the power operated means, the support means additionally including floor engaging means for engaging a substantially planar support surface such as a floor, and the support means further being operable to support the housing means and the auger means such that the inner chamber of the housing means and the axis of rotation of the auger means are inclined at a predetermined angle of inclination with respect to a support surface on which the floor engaging means serves to support the conveyor assembly, and such that the path of travel that is followed by the flow of food substance as it is conveyed through the inner chamber of the housing means is inclined relatively upwardly from the inlet location to the outlet location;

(b) providing heat extraction means for cooling the inner casing of the housing means so that, as the flow of food substance is conveyed through the inner chamber from the inlet location to the outlet location, heat energy is caused to be removed from the food substance by virtue of its being cooled through conductive heat transfer as the food substance engages the cooled inner casing, the heat extraction means including a second casing that surrounds the inner casing along at least a part of the length of the inner casing that extends between the inlet location and the outlet location, and that cooperates with the inner casing to define a generally annular refrigerant chamber that surrounds at least said part of the length of the inner casing for containing a refrigerant therein that is operable to cool the inner casing while also serving to contain the refrigerant so that the refrigerant is segregated from and does not come into direct contact with such food substance as may be fed through the inlet means, through the inner chamber and through the outlet means, the second casing being of generally cylindrical configuration and being oriented to extend substantially coaxially about the inner casing such that the second casing has a lower end region located in proximity to the inlet means, and an upper end region located in proximity to the outlet means, the heat extraction means further including refrigerant inlet means for introducing refrigerant into the annular refrigerant chamber in proximity to the lower end region of the second casing, and refrigerant outlet means for discharging refrigerant from the annular refrigerant chamber in proximity to the upper end region of the second casing, and including refrigerant flow path defining means cooperating with at least a selected one of the inner casing and the second casing to define at least one path of flow for refrigerant that extends from the refrigerant inlet means to the refrigerant outlet means, with the at least one path of flow for refrigerant extending about the circumference of the inner casing to maximize the extent to which the refrigerant is brought into heat transfer relationship with the inner casing as the refrigerant is ducted along said at least one path of flow for refrigerant;

(c) providing refrigeration control means for adjusting the degree to which the heat extraction means is operable to withdraw heat energy from the inner casing and to thereby cool the flow of food substance that is conveyed through the inner chamber, the control means including means for sensing the temperature at which refrigerant is permitted to discharge from the refrigerant outlet means, and valve means for admitting additional refrigerant to the refrigerant inlet means in response to sensed temperature of the discharged refrigerant, with the refrigeration control means being operable to introduce refrigerant in the form of a liquid cryogen through the refrigerant inlet means as such liquid cryogen is needed to maintain the temperature of the discharged refrigerant at or only slightly below a predetermined refrigerant discharge temperature, with the predetermined refrigerant discharge temperature being selected to be a temperature which the liquid cryogen will have evaporated to form a refrigerant gas, and being selected to be lower than a predetermined maximum discharge temperature for the food substance that discharges from the outlet means, and with the difference between the predetermined refrigerant discharge temperature and the predetermined maximum discharge temperature for the food substance being such as will assure that, to the extent that the flow of food substance that passes through the apparatus may vary in character, content and inlet temperature, the temperature at which the flow of food substance discharges from the discharge means will not exceed said predetermined maximum discharge temperature for the discharging flow of food, and such that the temperature at which the flow of food substance discharges from the discharge means will not differ by more than a few degrees Fahrenheit from said predetermined maximum discharge temperature for the discharging flow of food despite such variations as may occur in flow rate, chamber, consistency, temperature and the like of the food substance that enters the inlet means; and, (d) cooling a flow of food substance such as ground meat by operating the conveyor assembly, the heat extraction means and the refrigeration control means so that a relatively constant flow of the food substance is fed into the inlet means, through the inner chamber, and is discharged from the outlet means, while liquid cryogen refrigerant is admitted to the refrigerant chamber and is caused to flow along the refrigerant flow path to cool the inner casing whereby the flow of food substance passing through the inner casing is caused to be cooled, and at least a portion of the liquid cryogen is caused to take on sufficient heat energy to evaporate thus forming a refrigerant gas which is discharged from the refrigerant chamber with its discharge temperature being monitored and the monitored result being employed to control the supply of liquid cryogen to the refrigerant chamber such that the cumulative cooling effect that the refrigerant has on the flow of food substance serves to maintain the temperature of the flow that discharges through the discharge means within predetermined temperature limits.

13. The method of claim 12 additionally including the step of maintaining a predetermined positive pressure of the refrigerant within the refrigeration chamber by utilizing pressure responsive valve means for permitting discharge of gaseous refrigerant from the refrigerant chamber as is required to prevent pressure within the annular refrigerant chamber from exceeding a predetermined positive pressure.

14. The method of claim 13 wherein the admission of liquid cryogen to the refrigerant chamber is effected by utilizing refrigerant inlet means that includes conduit means for connection to a source of liquid cryogen such as liquid nitrogen, and the refrigerant inlet means is operable to admit said liquid cryogen into the lower end region of the refrigerant chamber, whereby as the liquid cryogen is caused to travel along the refrigerant flow path and to become heated as it takes on heat energy by causing the inner casing to be cooled, at least a portion of the liquid cryogen is caused to be transformed to a gaseous state, and the pressure of the gaseous cryogen is controlled by the pressure responsive valve means which serves to discharge portions of the gaseous cryogen when the pressure within the refrigerant chamber reaches said predetermined positive pressure.

15. The method of claim 12 additionally including the steps of:
   (a) providing a third casing that surrounds at least a majority of such portions of the second casing as serve to define the annular refrigerant chamber such that the third casing cooperates with the second casing to define a substantially annular insulating chamber that surrounds the vicinity of the annular refrigerant chamber; and,
   (b) insulating the insulating chamber to prevent unwanted loss of heat from the refrigerant chamber, by providing a polyurethane foam that has been foamed in-situ within the insulating chamber to substantially fill the insulating chamber.

16. The method of claim 12 wherein the power operated means that is provided for rotating the auger means includes a variable speed motor and speed control means for permitting the speed at which the auger means is rotated about its axis of rotation to be controlled, the method further including the step of adjusting the speed of operation of the motor so that the speed of rotation of the auger means advantageously serves the needs of the flow rate, character, consistency and temperature of the food substance that enters the inlet means.

17. The method of claim 12 additionally including the step of providing temperature sensing means for monitoring the temperature of the food substance that discharges from the outlet means to assure that the temperature of the discharging food substance does not exceed said predetermined maximum temperature, and the method includes the step of sounding an audible alarm if the temperature of the discharging food substance is found to exceed said predetermined maximum temperature.

* * * * *